UNITED STATES PATENT OFFICE.

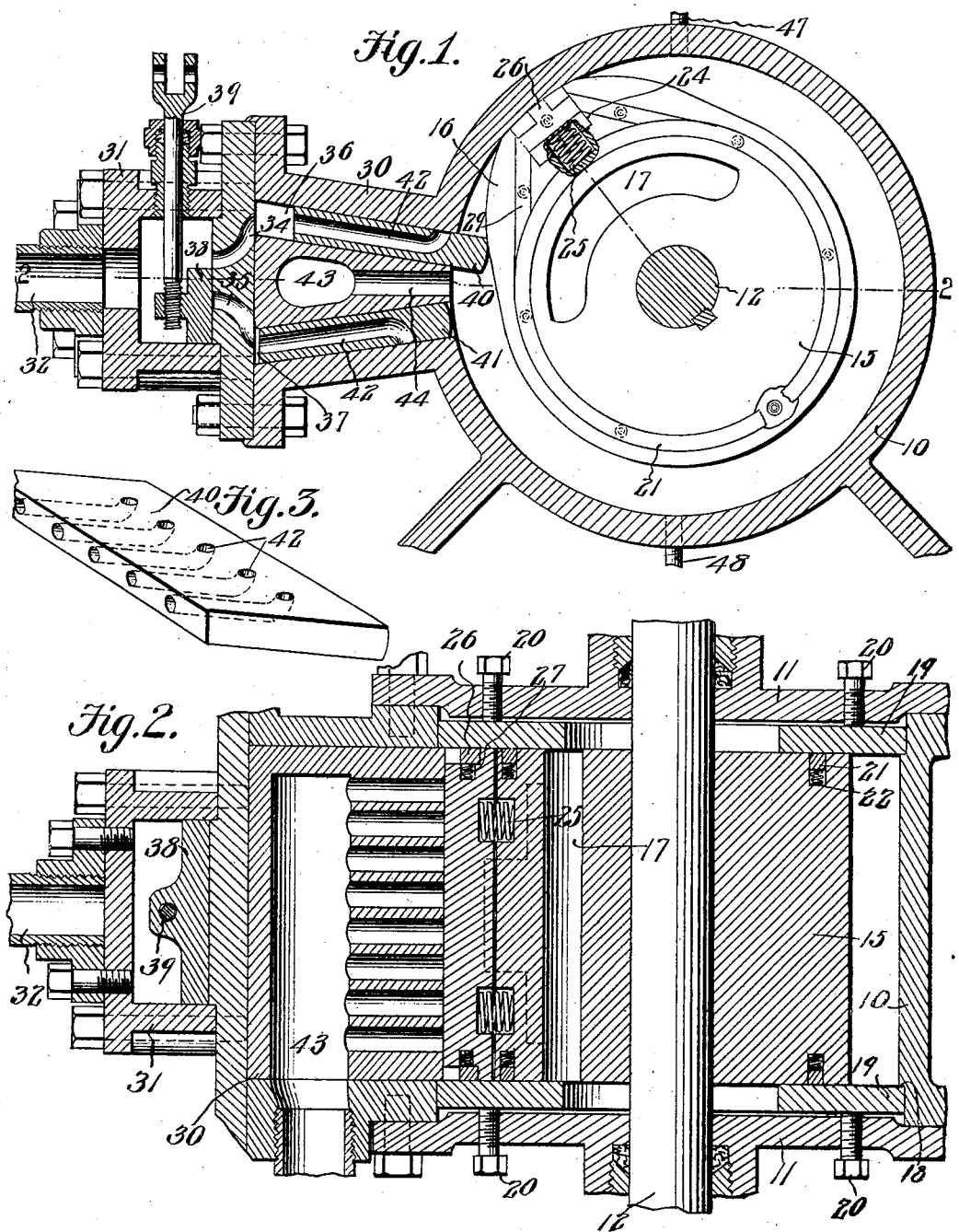

JAMES P. SHEPARD, OF WEST UNION, WEST VIRGINIA.

ROTARY ENGINE.

No. 823,228.

Specification of Letters Patent.

Patented June 12, 1906.

Application filed October 7, 1905. Serial No. 281,824.

*To all whom it may concern:*

Be it known that I, JAMES P. SHEPARD, a citizen of the United States, residing at West Union, in the county of Doddridge and State of West Virginia, have invented a new and useful Rotary Engine, of which the following is a specification.

This invention relates to rotary engines, and has for its principal object to provide a novel form of concentric piston-engine in which a slidable abutment is employed as an inlet-valve for the steam, air, or other fluid employed in the propulsion of the engine.

A further object of the invention is to provide a novel form of combined abutment and inlet-valve having an adjustable cut-off.

A still further object of the invention is to provide a reversible engine in which a pair of radially-movable abutments are arranged in close relation and provided with ports for the admission of the actuating fluid, the cylinder or valve casing being provided with exhaust-ports between the two abutments and serving to permit the escape of the exhaust-steam or the like admitted by either abutment.

Further objects of the invention are to improve and simplify the construction of the engine and the arrangement of its packing and to provide an engine that may be driven by steam, air, or other fluid under pressure or may be used as an internal-combustion engine.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of a rotary engine constructed in accordance with the invention. Fig. 2 is a sectional plan view of the same on the line 2 2 of Fig. 1. Fig. 3 is a detail perspective view of one of the movable abutments detached. Fig. 4 is a detail perspective view of one of the packing members.

Similar numerals of reference are employed to indicate corresponding parts throughout the several figures of the drawings.

The cylinder 10 is provided with a suitable base which may be formed integral therewith and has heads 11 provided with suitable bearings for the support of a main shaft 12.

To the shaft 12 is secured a piston-drum 15, from the periphery of which extends a piston-wing 16 for engagement with the inner circular wall of the cylinder, and that side of the drum bearing a wing is cored out, as indicated at 17, in order to equally distribute the weight of the piston around the axis of rotation. The end portions of the cylinder are counterbored, forming annular flanges 18, against which rest rings 19 for engagement with the ends of the piston-drum, and said rings are held in place and may be adjusted to compensate for wear by means of suitable bolts 20, extending through threaded openings formed in the cylinder-heads.

In each end of the piston-drum is an annular groove for the reception of a ring-packing strip 21, said strips being held outward against the rings 19 by helical compression-springs 22 disposed at intervals.

In the outer face of the piston-wing 16 is arranged transversely-extending groove for the reception of a packing-head 24, that is held outward by compression-springs 25, seated in recesses formed partly in the packing-head and partly in the piston-drum. At the opposite ends of the packing-head are T-shaped slots or recesses for the reception of correspondingly-shaped packing members 26, that are held outward by compression-springs 27. The ends of the piston-drum are further provided with grooves for the reception of packing-strips 29, that extend on lines tangential to the packing-strips 21 and are in contact with the packing-head 24 and the packing members 26, the packing as a whole extending continuously around the central portion of the ends of the drum and preventing the escape of the steam or other fluid around the shaft.

At one side of the cylinder is arranged an abutment-receiving head 30, to which is bolted a steam-chest 31, to which steam or other actuating fluid is supplied through a pipe 32. In this steam-chest are two ports 34 and 35, that lead, respectively, to abutment-receiving recesses 36 and 37. The ports are controlled by a reversing-valve 38, that is carried by a suitable stem 39, extending through a stuffing-box at one end of the steam-chest. By moving the stem endwise the valve may be adjusted to allow the actuating fluid to pass through one or other of the ports, and thus control the direction of rotation of the piston.

The abutment-receiving recesses 36 and 37 are arranged on lines radiating from the axis of rotation of the piston-drum, and each contains a slidable abutment designed to bear against the periphery of the piston-drum, the abutment 40 acting while the drum is rotating in the direction indicated by the arrow, Fig. 1, while the abutment 41 is brought into full play in order to rotate the drum in the opposite direction.

Each of these abutments is provided with a rounded inner end for engagement with the cam-face of the piston-wing 16, and in each is formed one or more ports or passages 42, that extend from the rear edge of the abutment to a point adjacent to its forward end, being thence turned and opening at one side of the abutment, the arrangement being such that the piston-wing must first pass the abutment before the latter in moving into the cylinder opens its steam-ports to permit the passage of the steam into the cylinder.

In the head 30 is arranged a main exhaust 43, which communicates with the cylinder through a number of exhaust-ports 44, that are disposed between the two abutments 40 and 41, the exhaust-ports being open at all times without regard to the direction of rotation of the piston-drum.

In the operation of the engine steam or other fluid is admitted from the steam-chest to one or other of the ports 34 35. If directed through the port 34, as shown in Fig. 1, the fluid-pressure will tend to force the abutment 40 inward, and as soon as the abutment moves far enough its ports 42 will open into the cylinder, and the actuating-fluid may pass through said ports and act on the piston-wing. As the drum nearly completes its revolution its cam-like face acts on the curved end of the abutment 40 and forces the latter inward, cutting off the flow of steam by closing the ports 42 before the abutment has moved wholly in. The abutment is held inoperative until the piston-wing has passed beyond it to an extent sufficient to allow the passage of steam through the ports 42 into the cylinder.

The direction of rotation of the engine may be reversed by simply changing the position of the reversing-valve 38. When used as an internal-combustion engine, the explosive mixture is directed through the ports in place of the steam, and leading into the annular space between the piston-drum and the cylinder are two pipes 47 and 48, which may constitute the igniting-tubes, commonly used in internal-combustion engines, or these devices may be in the form of sparking-plugs, if desired.

Having thus described the invention, what is claimed is—

1. The combination in a rotary engine, of a cylinder having a pair of spaced approximately radial recesses, an exhaust-port formed in the wall of the cylinder at a point between said recesses, a piston-drum arranged within the cylinder and provided with a radially-extending wing, radially-movable abutments mounted in the recesses and provided with ports that extend from the rear edges of the abutments to the operating-faces thereof, and pressure-supply ports leading to the recesses and provided with a valve for controlling the flow of fluid to either recess, and thus governing the direction of movement of the piston.

2. In a rotary engine, the combination with a cylinder, of a piston-drum having a cam-shaped wing, a packing-head arranged in the outer edge of the wing, packing-rings disposed in annular grooves at the opposite sides of the piston, and inclined packing-strips arranged in the groove formed in the opposite sides of the piston and extending from said annular grooves to the opposite edges of the packing-head.

3. In a rotary engine, the combination with a cylinder, of a piston-drum, a radially-extending piston-wing carried by the drum and provided with a recess facing the circular wall of the cylinder, a packing-head mounted in said recess, springs for holding said packing-head in contact with the wall of the cylinder, the opposite ends of said packing-head being provided with T-shaped slots or recesses, T-shaped packing members arranged in said slots or recesses, ring-packings at the ends of the piston, and inclined packing-strips extending from the ring-packings to the T-shaped packing members.

4. The combination in a rotary engine, of a cylinder, a piston-drum having a radially-extending abutment, that side of the drum bearing the abutment being cored out to evenly distribute the weight around the axis of rotation of the drum, packing-strips arranged at the ends of the drum, a ring bearing against said packing-strips, cylinder-heads, and ring-adjusting bolts extending through threaded openings in said cylinder-heads.

5. The combination in a rotary engine, of a cylinder having an extended abutment-receiving head at one side thereof, a steam-chest bolted to the head, radially-arranged abutments mounted in recesses in the abutment-head, ports leading from said recesses to the steam-chest, a reversing-valve disposed in the steam-chest and controlling the flow of fluid through said ports, a main exhaust-passage formed in the abutment-head, exhaust-ports leading from the cylinder to said passage, a piston-drum arranged within the cylinder, and a wing extending from the drum and arranged to engage the abutments.

In testimony that I claim the foregoing as my own I have hereto affixed my signature in the presence of two witnesses.

JAMES P. SHEPARD.

Witnesses:
BEN. W. BEE,
C. H. COLLINS.